3,202,662
NOVEL DERIVATIVES OF RING E KETO YOHIMBE
ALKALOIDS AND INTERMEDIATES THEREFOR
Jay Donald Albright and Leon Goldman, Nanuet, N.Y.,
assignors to American Cyanamid Company, Stamford,
Conn., a corporation of Maine
No Drawing. Filed May 24, 1963, Ser. No. 282,860
8 Claims. (Cl. 260—288)

This invention relates to new organic compounds and, more particularly, is concerned with novel derivatives of ring E keto yohimbe alkaloids which may be represented by the following general formula:

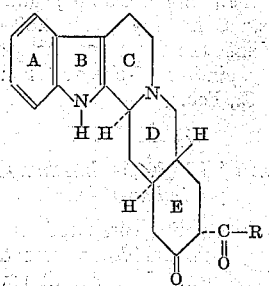

wherein R is phenyl or substituted phenyl. Suitable substituted phenyl groups contemplated by the present invention are, for example, o-, m-, or p-(lower alkyl)phenyl, o-, m-, or p-(halo)phenyl, o-, m-, or p-(lower alkoxy) phenyl and 3,4,5-tri(lower alkoxy) phenyl. Suitable lower alkyl and lower alkoxy groups contemplated by the present invention are those having from 1 to 6 carbon atoms with methyl, ethyl, methoxy and ethoxy being preferred. Halogen is exemplified by chlorine and bromine.

The novel compounds of the present invention are, in general, white to tan crystalline solids, the free bases of which are soluble in organic solvents such as alcohols, chloroform, dimethylformamide, dioxane, pyridine and the like; and the salts of which are soluble in polar solvents such as water and lower alkanols.

The novel compounds of the present invention are valuable central nervous system depressants of low toxicity and may be administered orally or parenterally. When so administered they have been found to exhibit tranquillizing action similar to reserpine in amounts ranging from about 25 to about 350 milligrams per kilogram of body weight. In addition, some of the novel compounds of the present invention have antibacterial properties.

The present invention also embraces the useful nontoxic pharmaceutically acceptable metal-enolate and acid-addition salts of these novel compounds. Typical metal-enolate salts are the sodium salts; and typical acid-addition salts are the hydrochlorides, hydrobromides, sulfates, citrates, tartrates, succinates, and the like. Although the novel compounds of the present invention may be used as such, they are more preferably administered in the form of their non-toxic acid-addition salts which may be readily prepared by treatment with one equivalent of an acid such as hydrochloric, sulfuric, phosphoric, critic, etc., in a suitable solvent.

The novel compounds of the present invention may be prepared from yohimban-17-one which has been described by Witkop, Ann. 554, 83 (1943). The first step in the synthesis of the novel compounds of the present invention consists of the preparation of a yohimban-17-enamine, which are also new compounds and included within the scope of the present invention, by treatment of yohimban-17-one with a secondary aliphatic amine such as dimethylamine, diethylamine, pyrrolidine, piperidine, morpholine, N-methylpiperazine, and the like. This reaction is ordinarily carried out by refluxing (with or without an acid catalyst such as p-toluenesulfonic acid, sulfuric acid, or the like) a mixture of the amine and yohimban-17-one in benzene, toluene, xylene, or some other inert, water immiscible solvent, with azeotropic removal of water, for a period of time ranging from 3 to 24 hours, more or less. Good results are achieved, for example, when the refluxing distillate is passed through a water absorbent such as alumina, anhydrous magnesium sulfate, or the like in a Soxhlet extractor, thereby continuously removing the water azeotropically distilled. The solvent and excess amine are then removed by concentration under vacuum, and the enamine is taken up from the dry residue in chloroform or another suitable inert solvent such as benzene, dioxane, tetrahydrofuran, dichloromethane or the like. The resulting enamine in solution may then be reacted with an appropriate acid halide to prepare the novel compounds of the present invention according to the following reaction scheme:

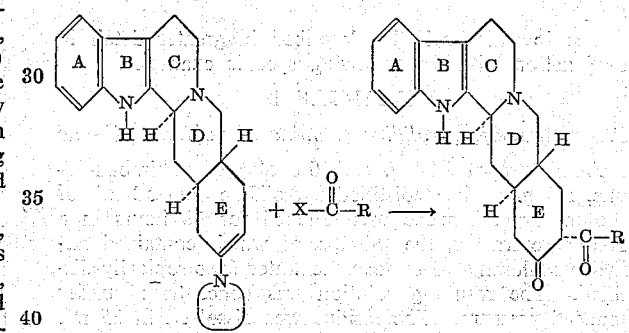

wherein is the secondary aliphatic amino residue, X is halogen (such as chlorine or bromine), and R is as hereinabove defined. This reaction is ordinarily carried out under anhydrous condition in an inert solvent such as chloroform, dioxane, carbon tetrachloride, dichloromethane, and the like; at temperatures of from about 0° C. to about 100° C.; and over a period of time of from 5 to 24 hours, more or less. An acid acceptor such as triethylamine, quinoline, pyridine, and the like, is preferably employed. After the reaction is complete, the reaction mixture is poured into aqueous mineral acid (e.g., hydrochloric acid, sulfuric acid, etc.), and the resulting mixture stirred at room temperature for 1–5 hours or so. Finally, the mixture is brought to ca. pH 7.5 with aqueous base and the product is extracted with chloroform, benzene, toluene, or the like, and recovered by concentrating the pooled extracts. Purification is effected by conventional means. Acid halides contemplated for the preparation of the novel compounds of this invention are the lower alkanoyl halides such as acetyl bromide, propionyl chloride, butyryl chloride, and the like; and aroyl halides such as benzoyl chloride, o-methoxybenzoyl chloride, o-chlorobenzoyl chloride, 3,4,5-trimethoxybenzoyl bromide, etc.

The novel compounds of the present invention are also useful intermediates in the preparation of ring E heterocyclic derivatives of yohimbe alkaloids. For example, the novel compounds of the present invention may be converted to ring E heterocyclic derivatives, useful as central nervous system depressants and as hypotensive agents, by treatment with hydroxylamine, hydrazine, mono(lower alkyl) hydrazine and phenylhydrazine. This reaction is ordinarily carried out in an inert solvent such as ethanol, dioxane, glacial acetic acid and the like, at temperatures from 25° C. to 150° C., and over a period of time of from 15 minutes to 6 hours, more or less. When hydrazine is employed, a ring E heterocyclic derivative is obtained having a nuclear secondary nitrogen atom. This nuclear secondary nitrogen atom may be alkylated or acylated by conventional procedures employing, for example, methyl iodide, ethyl bromide, acetic anhydride, trimethoxybenzoyl chloride, and the like.

It is to be understood that the novel compounds of the present invention may exist in other tautomeric forms according to the following tautomeric scheme:

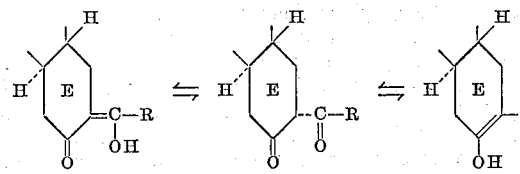

wherein only ring E of the yohimbane structure is represented for purposes of simplicity, and wherein R is as previously defined. These various tautomeric forms are also included within the purview of the present invention.

The invention will be described in greater detail in conjunction with the following specific examples.

EXAMPLE 1

*Preparation of pyrrolidine enamine of yohimban-17-one*

A mixture of 2.94 g. (0.010 mole) of yohimban-17-one, 5.0 g. of dry redistilled pyrrolidine, and 50 ml. of sodium dried benzene was refluxed for 18 hours in a Soxhlet extractor, the thimble of which contained anhydrous alumina to remove the water azeotropically distilled. The resulting solution was concentrated under reduced pressure. The residue was dissolved in 25 ml. of dry chloroform and the solvent again removed under reduced pressure. The reddish glass was heated at 90–100° C. under high vacuum for 2 hours to remove the last traces of pyrrolidine to yield the pyrrolidine enamine of yohimban-71-one

EXAMPLE 2

*Preparation of 18-acetylyohimban-17-one*

A solution of the pyrrolidine enamine, prepared as in Example 1, from 14.7 g. of yohimban-17-one, in 100 ml. of chloroform was cooled by means of an ice bath and treated consecutively with 8.0 ml. of dry triethylamine and 3.93 g. of acetyl chloride. After being allowed to stand at room temperature under nitrogen for 17 hours, the mixture was treated with 50 ml. of water and 15 ml. of glacial acetic acid, and stirred for 1.5 hours. The pH of the mixture was adjusted to 7.0 with dilute ammonium hydroxide and the chloroform layer separated. The aqueous layer was extracted with four 100-ml. portions of chloroform and the combined chloroform extracts were washed with 200 ml. of water, dried over sodium sulfate, and concentrated under reduced pressure. The residual solid was triturated with ethanol to give 14.1 g. of crystals. By repeated recrystallizations from methanol, and then from ethyl acetate, yohimban-17-one was separated from the product and there was obtained 3.74 g. of 18-acetyl-yohimban-17-one as tan crystals, melting point 223–226° C. dec.

EXAMPLE 3

*Preparation of 18-benzoylyohimban-17-one*

The pyrrolidine enamine, prepared as in Example 1, from 2.94 g. of yohimban-17-one, was dissolved in 20 ml. of dry chloroform. The solution was cooled by means of an ice bath and 1.40 ml. of dry triethylamine was added. To this red-brown solution was added 0.93 ml. of benzoyl chloride. The mixture was allowed to stand under nitrogen at room temperature for 19 hours and then was treated with 20 ml. of acetic acid-water (1:1). After stirring for 1 hour, the mixture was brought to pH 7 with dilute ammonium hydroxide, and diluted with an additional 25 ml. of chloroform. After filtering, the organic layer was separated and the aqueous layer extracted with three 50-ml. portions of chloroform. The organic layer and chloroform extracts were combined, dried over sodium sulfate, and concentrated to a glass under reduced pressure. The glass was triturated with 60 ml. of hot methanol. Cooling and filtering gave 1.48 g. of crystals, melting point 200–220° C., dec. Several recrystallizations from acetone-water gave 0.330 g. of 18-benzoylyohimban-17-one as tan needles, melting point 231–235° C., dec.

EXAMPLE 4

*Preparation of 18-(3,4,5-trimethoxybenzoyl)-yohimban-17-one*

The pyrrolidine enamine, prepared as in Example 1, from 2.94 g. of yohimban-17-one, was dissolved in 20 ml. of dry chloroform. The solution was cooled by means of an ice bath and 1.40 ml. of dry triethylamine was added. To this solution was added 1.84 g. of 3,4,5-trimethoxybenzoyl chloride. The mixture was allowed to stand at room temperature under nitrogen for 18 hours and then was treated with dilute acetic acid. After stirring at room temperature for one hour, the mixture was diluted with 25 ml. of chloroform and brought to pH 7.5 with dilute ammonium hydroxide. The organic layer was separated and the aqueous layer extracted with chloroform. The organic layer and the chloroform extracts were combined, washed with 25 ml. of a saturated sodium bicaronate solution, dried over sodium sulfate, and concentrated under reduced pressure to a reddish glass. The glass was dissolved in ethanol, treated with activated charcoal, and the solution filtered. Concentration of the filtrate under reduced pressure afforded a glass which was crystallized from aqueous ethanol to give 0.91 g. of pink crystals, melting point 200–205° C., dec. The crystals were dissolved in chloroform: ethanol (1:1) and the solution concentrated to 25 ml. A gel formed and 10 ml. of acetone was added. Dilution with water and filtration gave 0.454 g. of 18-(3,4,5-trimethoxybenzoyl)yohimban-17-one as tan needles, melting point 222–228° C., dec.

EXAMPLE 5

*Preparation of 18-(p-bromobenzoyl)yohimban-17-one*

A solution of the pyrrolidine enamine of yohimban-17-one (0.05 mole) in 72 ml. of dry dichloromethane and 25 ml. of dry triethylamine was treated with 4.94 g. of p-bromobenzoyl chloride. The mixture was cooled by means of an ice bath and allowed to stand under nitrogen at room temperature for 18 hours. The solvent was removed under reduced pressure, and the residue dissolved in 50 ml. of chloroform and poured onto a mixture of 75 g. of ice and 20 ml. of glacial acetic acid. After being stirred at room temperature for 2 hours, the mixture was cooled and brought to pH 7.5 with concentrated ammonium hydroxide. Chloroform (50 ml.) was added and the organic layer separated. The aqueous layer was extracted with four 100-ml. portions of chloroform. The combined chloroform extracts were dried over magnesium sulfate and the solvent removed under reduced pressure. Benzene was added to the residue and the solvent removed under reduced pressure. Trituration of the residue with ethanol and filtration gave 5.42 g. of brown crystals. Recrystallization from acetone with the aid of activated carbon gave 1.60 g. of yohimban-17-one and 3.75 g. of impure 18-(p-bromobenzoyl-yohimban-17-one. Recrystallization for ethanol and from acetone gave the product as light yellow rods, melting point 241–244° C., dec.

EXAMPLE 6

*Preparation of 18-(p-toluyl)yohimban-17-one*

A solution of the pyrrolidine enamine of yohimban-17-one (0.025 mole) in 72 ml. of dry dichloromethane and 25 ml. of dry triethylamine was treated with 3.48 g. of p-toluyl chloride. The mixture was cooled briefly by means of an ice bath and allowed to stand at room temperature under nitrogen for 19 hours. The solvent was removed under reduced pressure and the residue was dissolved in 50 ml. of chloroform and poured onto a mixture of 75 g. of ice and 20 ml. of glacial acetic acid. The mixture was stirred for two hours at room temperature and brought to pH with concentrated ammonium hydroxide. Chloroform (50 ml.) was added and the organic layer separated. The aqueous layer was extracted with four 100-ml. portions of chloroform, the combined extracts were dried over magnesium sulfate, and the solvent removed under reduced pressure. Benzene was added to the residue and the solvent removed under reduced pressure. The residue was triturated with 150 ml. of ethanol and the gel which formed was removed by filtration and washed with ethanol. The gel was dried under reduced pressure over phosphorus pentoxide at room temperature. The dried solid (6.58 g.) was crystallized from aqueous acetone with the aid of activated carbon to yield 5.50 g. of impure 18-(p-toluyl)yohimban-17-one, melting point sinters above 130° C. to a viscous mass which then slowly melts. Recrystallization from aqueous acetone gave the product as tan crystals, melting point 190–195° C., dec. (sinters to a viscous mass above 130° C.).

EXAMPLE 7

*Preparation of 18-propionylyohimban-17-one and 18-propionylyohimban-17-one hydrochloride*

A solution of the pyrrolidine enamine of yohimban-17-one (0.025 mole) in 72 ml. of dry dichloromethane and 25 ml. of triethylamine was treated with 2.0 ml. of propionyl chloride. The mixture was cooled briefly and allowed to stand at room temperature for 46 hours. The solvent was removed under reduced pressure, and the residue dissolved in 60 ml. of chloroform. The solution was poured onto a mixture of 75 g. of ice and 20 ml. of glacial acetic acid and, after being stirred at room temperature for 3 hours, the mixture was brought to pH 7.5 with concentrated ammonium hydroxide. Chloroform (150 ml.) was added and to the emulsion which formed was added 50 ml. of ethanol and 50 ml. of water. The organic layer was separated and the aqueous layer extracted with five 100-ml. portions of chloroform. The combined extracts were dried over magnesium sulfate and the solvent was removed under reduced pressure. By crystallization of the residue from ethanol, aqueous ethanol, aqueous acetone, and ethyl acetate, yohimban-17-one and other impurities were separated from the product which remained as the most soluble component. In this way the product was obtained to a benzene soluble glass which was precipitated by dilution of the benzene solution with cyclohexane. The 18-propionylyohimban-17-one was obtained as a tan amorphous solid, melting point 154–159° C., dec. Treatment of the product in ether was hydrogen chloride and filtration gave the hydrochloride which was crystallized from methanol-acetone to give tan crystals, melting point 268–272° C., dec.

What is claimed is:
1. 18α-benzoylyohimban-17-one.
2. 18α-(3,4,5-trimethoxybenzoyl)yohimban-17-one.
3. 18α-(p-bromobenzoyl)yohimban-17-one.
4. 18α(p-toluyl)yohimban-17-one.
5. A compound of the formula:

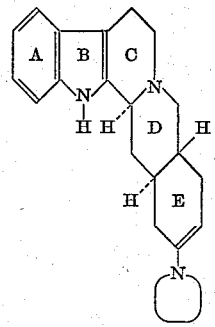

wherein

is selected from the group consisting of dimethylamino, diethylamino, pyrrolidino, piperidino, morpholino and N-methylpiperazino.

6. A member selected from the group consisting of compounds of the formula:

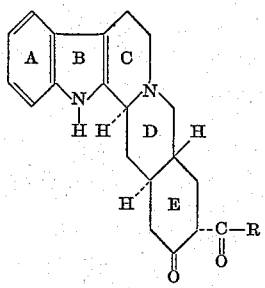

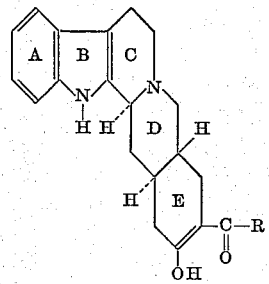

and

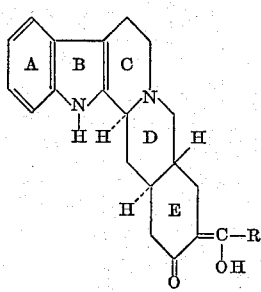

wherein R is selected from the group consisting of phenyl, mono(lower alkyl)phenyl, mono(halo)phenyl, mono(lower alkoxy)phenyl and 3,4,5-tri(lower alkoxy)phenyl;

the alkali metal enolates thereof and the non-toxic pharmaceutically acceptable acid-addition salts thereof.
7. 17-pyrrolidinoyohimb-17-ene.
8. 17-diethylaminoyohimb-17-ene.

References Cited by the Examiner
UNITED STATES PATENTS

| | | | |
|---|---|---|---|
| 2,793,210 | 5/57 | Voegtli | 260—288 |
| 3,076,811 | 2/63 | Bartlett | 260—288 |
| 3,159,623 | 12/64 | Shavel et al. | 260—240 |

OTHER REFERENCES

Hunig et al., Berichte, vol. 93 (1960), pages 909–913.

WALTER A. MODANCE, *Primary Examiner*.
NICHOLAS S. RIZZO, *Examiner*.